(12) United States Patent
Murata et al.

(10) Patent No.: US 9,088,227 B2
(45) Date of Patent: Jul. 21, 2015

(54) MOTOR CONTROLLER, IMAGE PROCESSING APPARATUS INCLUDING THE MOTOR CONTROLLER, AND MOTOR CONTROL METHOD

(71) Applicants: Takuya Murata, Tokyo (JP); Natsuko Ishizuka, Kanagawa (JP)

(72) Inventors: Takuya Murata, Tokyo (JP); Natsuko Ishizuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 13/954,093

(22) Filed: Jul. 30, 2013

(65) Prior Publication Data

US 2014/0044466 A1 Feb. 13, 2014

(30) Foreign Application Priority Data

Aug. 8, 2012 (JP) ................... 2012-175502

(51) Int. Cl.
*G03G 15/00* (2006.01)
*G03G 21/00* (2006.01)
*B41J 29/38* (2006.01)
*H02P 6/00* (2006.01)

(52) U.S. Cl.
CPC . *H02P 6/003* (2013.01); *H02P 6/00* (2013.01)

(58) Field of Classification Search
CPC ......... G03G 15/00; G03G 21/00; B41J 29/38; H02P 3/02; H02P 3/08; H02P 6/145; H02P 6/002; H02P 6/00
USPC .......... 399/361, 363–365, 381, 388, 394–397
See application file for complete search history.

(56) References Cited

U.S. PATENT DOCUMENTS

| | | | | |
|---|---|---|---|---|
| 5,493,188 A | * | 2/1996 | Yoshikawa et al. | 318/400.09 |
| 5,838,124 A | * | 11/1998 | Hill | 318/269 |
| 7,448,615 B2 | * | 11/2008 | Takamura | 271/176 |
| 7,944,159 B2 | * | 5/2011 | Paintz et al. | 318/400.01 |
| 2002/0011811 A1 | * | 1/2002 | Chen et al. | 318/254 |
| 2003/0227271 A1 | * | 12/2003 | Shindo | 318/439 |
| 2008/0181701 A1 | * | 7/2008 | Fukasawa et al. | 399/410 |

(Continued)

FOREIGN PATENT DOCUMENTS

| | | | | |
|---|---|---|---|---|
| EP | 2621078 A1 | * | 7/2013 | ............... H02P 6/00 |
| JP | 2004-324105 | | 11/2004 | |
| JP | 2012-213308 | | 11/2012 | |

OTHER PUBLICATIONS

U.S. Appl. No. 13/749,963, filed Jan. 25, 2013.

(Continued)

*Primary Examiner* — Nguyen Ha
(74) *Attorney, Agent, or Firm* — Oblon, McClelland, Maier & Neustadt, L.L.P.

(57) ABSTRACT

A motor controller, operatively connected to a motor having an output shaft, includes a rotary detector to detect a rotation direction and a rotation amount of the output shaft of the motor to generate an actual rotary signal, a drive controller to generate a control signal based on the actual rotary signal and a target rotary signal indicating a target rotary direction and a target rotary amount, and a driver to supply a driving power to the motor based on the control signal. When the motor is in a hold state, the control signal is reversed periodically for a predetermined reverse time period T2 per a predetermined one reverse cycle T1. When the control signal is not reversed for a certain lock detection time period Tr that is longer than the revere cycle T1 of the control signal, supply of the driving power to the motor is blocked.

7 Claims, 9 Drawing Sheets

(56) References Cited

U.S. PATENT DOCUMENTS

| | | | |
|---|---|---|---|
| 2009/0190972 A1* | 7/2009 | Ohkubo et al. | 399/301 |
| 2011/0026994 A1* | 2/2011 | Ryu | 399/396 |
| 2013/0193889 A1* | 8/2013 | Huwiler et al. | 318/400.38 |
| 2013/0200836 A1 | 8/2013 | Ishizuka et al. | |

OTHER PUBLICATIONS

U.S. Appl. No. 13/751,209, filed Jan. 28, 2013.

* cited by examiner

MOTOR CONTROLLER, IMAGE PROCESSING APPARATUS INCLUDING THE MOTOR CONTROLLER, AND MOTOR CONTROL METHOD

CROSS-REFERENCE TO RELATED APPLICATION

This patent application is based on and claims priority pursuant to 35 U.S.C. §119 to Japanese Patent Application No. 2012-175502, filed on Aug. 8, 2012 in the Japan Patent Office, the entire disclosure of which is hereby incorporated by reference herein.

BACKGROUND

1. Technical Field

The present disclosure relates to a motor controller, an image processing apparatus including the motor controller, and a motor control method executed by the motor controller.

2. Related Art

With image readers contained in scanners, copiers, facsimiles, and multi-function devices, and image processing apparatus, such as image forming apparatuses, accuracy in reading and forming images is ensured by accurately operating relevant movable parts.

For example, in a state in which a fixed image reader reads a document while a document feeder, such as an Auto Document Feeder (ADF), transports successive documents, a light source irradiates each transported document with light and a photoelectric conversion element such as a Charge Coupled Device (CCD) receives the light reflected from the document and photoelectrically converts the image into an electrical image signal line by line. It should be noted that the document feeder includes a driving motor and a document transport roller, and the driving motor drives the document transport roller to transport the documents at a predetermined constant speed to the image reader for reading.

In addition to the light source and the CCD, the image reader also includes a movable image reading element and a reader transport unit. When the document is placed on an exposure glass or platen, the reader transport unit, which includes a driving motor, roller, and a belt, moves the movable image reading element at a constant speed in a sub-scanning direction while the light source irradiates the document placed on the exposure glass with light and the CCD in the image reader receives the light reflected from the document to photoelectrically convert the read image into an electrical image signal line by line.

In addition, for example, in an inkjet image forming apparatus, an image is formed on a sheet of recording media by repeatedly performing an image forming process to eject ink for a predetermine number of lines and by a transport process to intermittently advance the sheet for the predetermined lines using a driving motor.

At present, direct-current (DC) motors, in particular, brushless DC motors, are widely used as the above-described driving motors.

The brushless DC motor includes a rotor having a permanent magnet but does not include a brush. Therefore, in order to detect the magnet rotor, as a position detection element, in general, a Hall IC is provided, or an inductive voltage generated in a stator coil is detected by a motor control unit and the position of the magnet rotor is estimated.

In the image processing apparatus described above, for example, in order to slacken the sheet or document, it is necessary to stop the transport of the document or sheet while the motor position is maintained as is (that is, the motor is in a position hold state). However, the driver that drives the motor based on a control signal generally deems the motor to be locked and idle when the control signal is not changed for a predetermined time period, and the driver too enters a locked state in which the driver blocks output to the brushless motor.

To solve this problem, JP-2004-324105-A discloses setting a threshold value used for determining whether the motor is a normal rotary state or the position hold state, at which point the output polarity is reversed to avoid erroneous recognition. More specifically, by setting a reversed time of an output polarity to the threshold value, it is determined that the motor is in the normal rotary state or the position hold state.

However, with this arrangement, this example cannot distinguish between the locked state determined when the control signal is not changed for a predetermined time period and the position hold state, which may erroneously recognize the hold state as the locked state. When the hold state is erroneously recognized as the locked state, the driver stops the output to the motor, such that the sheet and document cannot be hold at an intended position, and the suitable transportation cannot be performed. Therefore, it is desired to accurately distinguish between the hold state and the locked state and keep the hold state.

SUMMARY

In view of the above, it is a general object of the present invention to provide an improved motor controller operatively connected to a motor having an output shaft. The motor controller includes a rotary detector, a drive controller, and a driver. The rotary detector detects a rotation direction and a rotation amount of the output shaft of the motor to generate an actual rotary signal. The drive controller receives a target rotary signal indicating a target rotary direction and a target rotary amount, and generates a control signal based on the actual rotary signal and the target rotary signal generated by the rotary detector. The driver supplies driving power to the motor based on the control signal from the drive controller. When the motor is in a hold state, the drive controller periodically generates a reverse control signal whose polarity is reversed for a predetermined reverse time period T2 per a predetermined one reverse cycle T1. When the reverse control signal is not output from the driver controller for a certain lock detection time period Tr that is longer than the revere cycle T1 of the control signal, the driver blocks supply of the driving power to the motor, to put the motor in a locked state.

In another embodiment of the present disclosure, there is provided an image processing apparatus including a transporting mechanism having a motor having an output shaft to transport sheet of papers, an image forming unit to form an image using the sheet of paper, and the above-described motor controller.

In yet another embodiment of the present disclosure, there is provided a motor control method to control a motor having an output shaft, including the steps of: detecting a rotation direction and a rotation amount of the output shaft of the motor to generate an actual rotary signal; receiving a target rotary signal indicating a target rotary direction and a target rotary amount; generating a control signal based on the actual rotary signal and the target rotary signal; when the motor is in a hold state, reversing the control signal periodically for a predetermined reverse time period T2 per a predetermined one reverse cycle T1; supplying a driving power to the motor based on the control signal; and when the control signal is not reversed for a certain lock detection time period Tr that is longer than the revere cycle T1 of the control signal, blocking supply of the driving power to the motor to put the motor in a locked state.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
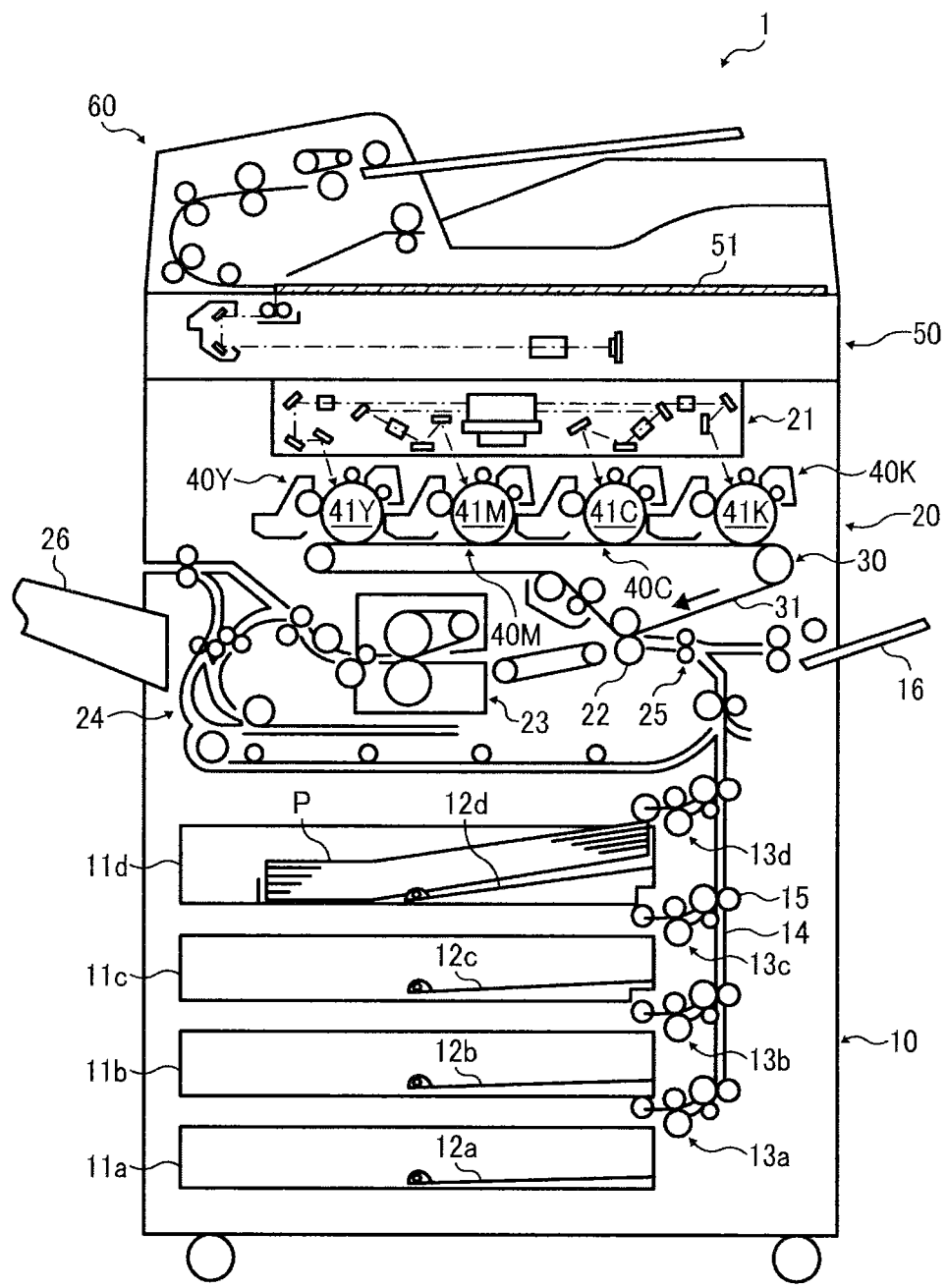
FIG. 1 is a front schematic diagram illustrating a color printer according to the present disclosure.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, particularly to FIGS. 1 through 11, a motor control device according to illustrative embodiments are described. It is to be noted that although the image forming apparatus of the present embodiment is described as a printer, the image forming apparatus of the present invention is not limited thereto. In addition, it is to be noted that the suffixes Y, M, C, and K attached to each reference numeral indicate only that components indicated thereby are used for forming yellow, magenta, cyan, and black images, respectively, and hereinafter may be omitted when color discrimination is not necessary.

(Configuration and Operation of Image Forming Apparatus)

FIGS. 1 to 11 are diagrams illustrating a motor control device, an image processing apparatus, a motor control method, and a moor control program according to the present disclosure. FIG. 1 is a front schematic diagram illustrating a digital color printer 1 according to the present disclosure.

In the digital color printer (image processing apparatus) 1 shown in FIG. 1, a sheet feeder 10, an image forming device 20, a document reader 50, and an automatic document feeder (ADF) 60 are provided from bottom to top, and an operational display (not shown) is provided on the document reader 50.

In the sheet feeder 10, multiple sheet feed trays 11a to 11d are arranged in vertical direction, the sheet trays 11a to 11d respectively contain multiple sheet paper P, and have bottom plates 12a to 12d to place sheet P so that a leading edge of the sheet P is placed inclined upward. The respective sheet feed trays 11a to 11d include roller group (feeding roller, separation roller) 13a to 13d that separate the sheet P one by one in the corresponding sheet feed trays 11a to 11d. In the sheet feeder 10, multiple sheet feed roller 15 are arranged along a sheet transport path 14, the sheet P sent from one of the sheet feed trays 11a to 11d is conveyed to the image forming unit 20 via the sheet transport path 14 by a transport roller 15. In addition, the color printer 1 includes a manual sheet feeder 16, and the sheet P set in the manual sheet feeder 16 is transported to the image forming device 20.

The image forming device 20 includes a transport belt mechanism 30, multiple color image forming units 40Y, 40M, 40C, and 40K for respective colors containing a yellow (Y), a magenta (M), a cyan (C), and a black (K) provided along a transfer belt 31 of the transfer mechanism 30, a light writing unit 21, a second transfer member 22, a fixing device 23, a sheet reverse member 24, a registration roller 25, a sheet discharge tray 26. The image forming device 20 further includes a driving mechanism to transmit a driving source driving to the motor and motor and a motor source, which is described in further detail later.

The respective image units 40Y, 40M, 40C, and 40K include photoreceptors 41Y, 41M, 41C, and 41K. Chargers (not shown) to uniformly charge the surface of the photoreceptors 41Y, 41M, 41C, and 41K, development devices (not shown) to visualize an electrostatic latent image formed on the surface of the photoreceptors 41Y, 41M, 41C, and 41K to form toner images, transfer members (not shown) to transfer the respective colors of toner images on the photoreceptors 41Y, 41M, 41C, and 41K to superimposed the toner images respectively, and cleaning members (not shown) to remove and collect the residual toner remained in the photoreceptors 41Y, 41M, 41C, and 41K after transfer process are provided on the photoreceptors 41Y, 41M, 41C, and 41K.

In the image forming device 20, the image data read by the document reader 50 or the image data received from a host device such as a personal computer (not shown) via a network, and the image data received by facsimile is input to the light writing unit 21, and the light writing unit 21 modulate a laser light based on each color of data in the image data to emit the light to the photoreceptors 41Y, 41M, 41C, and 41K in the respective colors of imaging units 40Y, 40M, 40CM and 40K to form the respective color electrostatic images on the photoreceptors 41Y, 41M, 41C, and 41K.

In the image forming device 20, the development devices attracts the toner to the electrostatic latent images on respective colors of the photoreceptors 41Y, 41M, 41C, and 41K in the image forming units 40Y, 40M, 40C, and 40K to form the toner images. Then, the formed toner images are subsequently superimposed on the transfer belt 31 to form multicolor toner image on the transfer belt 31. Then, the multicolor toner image on the transfer belt 31 is secondary transferred on the sheet P, while the arrival time of the sheet P from the sheet feeder 10 is adjusted by the registration roller 25. That is, the sheet P from the sheet feeder 10 is transported to the registration roller 25, and the timing of transferring toner image is adjusted, the sheet P is sent to an area between the secondary transfer member 22 to the transfer belt 31.

In the image forming device 20, the secondary transfer member 22 transfers the toner image on the transfer belt 31 onto the sheet P. Then, the sheet P on which the toner image is transferred is conveyed to the fixing device 23, the toner image is fixed on the sheet P with heat and pressure in the fixing device 23. The sheet P after the fixing process is finished is discharged to the discharge tray 26.

Alternatively, if necessary, the sheet P after the fixing process is finished is reversed at the sheet reverse device 24 to transport an area between the secondary transfer member 22 and the transfer belt 31 and then, the toner image is transferred onto a backside of paper P. In the image forming device 20, the sheet P on which the toner image is transferred on the backside face of the sheet P is fixed by the fixing device 23, and the sheet P is discharged to the discharge tray 26.

In FIG. 1, the document reader 50 scans the document G set on the exposure glass 51 in a main scanning direction and a sub-scanning direction to read the image on the document. In addition, the ADF 60 transports the document of sheet G one by one to the reading position of the document reader 50. The document reader 50 subsequently reads the image on the document G transported to the reading position by the ADF 60. In addition, the ADF 60 is openably attached to a top of the exposure glass 51. By opening the ADF 60, the document G can set on the exposure glass 51. When the ADF 60 is closed in a state in which the document G is set on the exposure glass 51, the ADF 60 functions as a pressure plate to press the document to the exposure glass 51.

Figure 2:
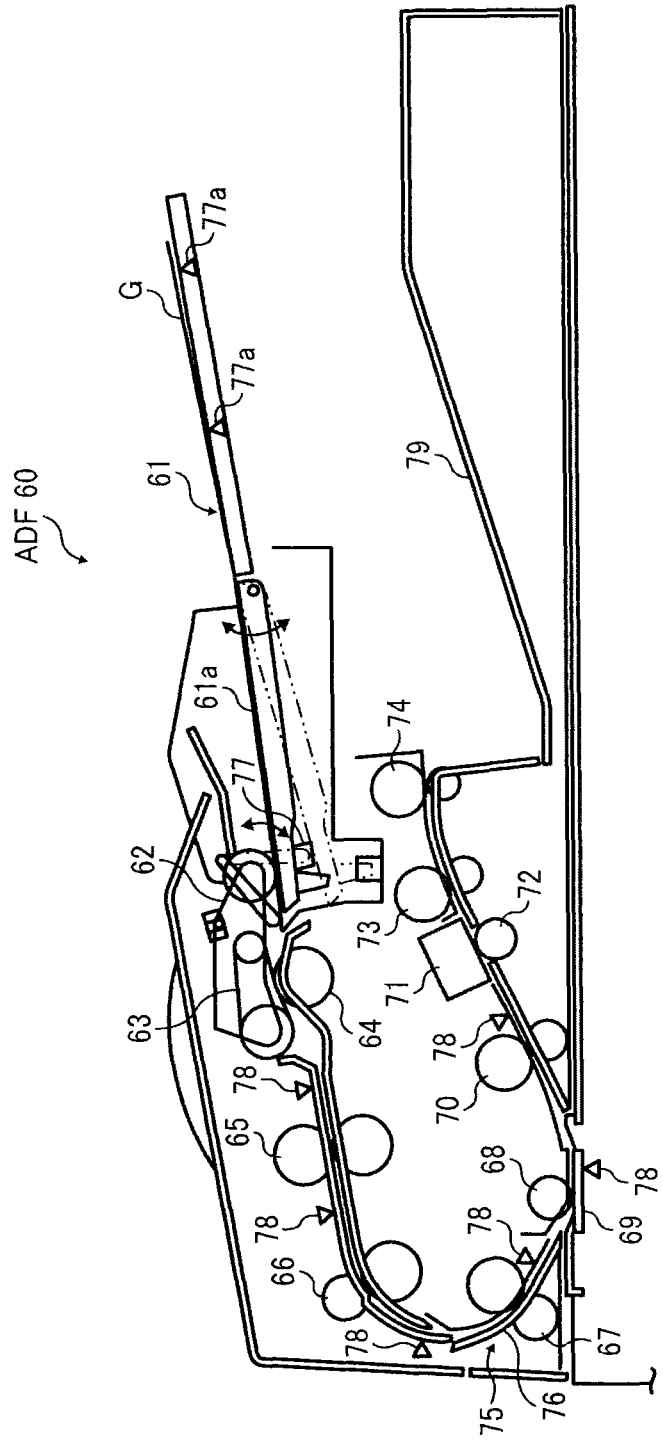
FIG. 2 is a side schematic diagram of ADF.

As illustrated in FIG. 2, the ADF 60 includes a document table 61, a pickup roller 62, a sheet feed belt 63, a revere roller 64, a pull-out roller 65, an intermediate roller 66, a scanning entrance roller 67, a first pushing roller 68, a first document glass 69, a scanning exit roller 70, a second scanning member 71, a second pushing member 72, a second scanning exit roller 73, and a sheet discharge roller 74 are provided along a transport guide plate 76 constituting a transport path 75. In addition, a setting sensor 77, a document length sensor 77a, and multiple other sensors 78 are provided along the transport path 75. In the ADF 60, the document table 61 includes a movable document table 61a that rotates in a vertical direction as indicated by an arrow shown in FIG. 2. Beneath the document table 61, a document discharge tray 79 is provided downstream from the sheet discharge roller 74.

In the color printer 1, when the document G is scanned using the ADF 60, the document reader (scanner) 50 is moved to an area beneath the first exposure glass 69, and the document reader 50 reads the image on the document G transported to the first exposure glass 69.

In the ADF 60, when the setting sensor 77 and the document length sensor 77a detect that the condition in which the document G is placed with the image face up in an area between the movable document table 61a and the pickup roller 62, the ADF 60 causes a brushless DC motor 100 (to be described below with reference to FIGS. 3 to 7) to drive and rotate so that the pickup roller 62 sends the document G to the area between the sheet feed belt 63 and the reverse roller 64. Then, the sheet feed belt 63 transports the document G in a direction in which the document G is transported forward and the revere roller 64 rotates in a direction in which the document G is transported backward, only a top sheet of the documents G can be separated and transported to the pull-out roller 65.

The ADF 60 transports the one sheet fed to the pull-out roller 65 is transported onto the first exposure glass 69 by the intermediate roller 66 and the first scanning entrance roller 67. When the sensor 78 positioned immediately upstream area from the first exposure glass 69 detects the document G, the first pushing roller 68 and the first scanner exit roller 70 transport the document G onto the first exposure glass 69. Along with this process, the scanner reads the image on the document face of the document G timed to coincide with transporting the document G in corporation with transport of the document G to the reading position by the document reader 50.

The first scanner exit roller 70 transports the document G after the image face is scanned to an area between the second scanning member 71 and the second pushing roller 72. When the backside face of the document G is scanned, the second canner 71 reads the backside face of the document G while the document G is transported between the second scanner 71 and the second pushing roller 72 using the second exit roller 70, the second pushing roller 72, and the second exit roller 73.

The second scanner 71 is constituted by a contact image sensor using a CCD. Then, in the ADF 60, the second exit roller 73 transports the document G to the sheet discharge roller 74 and then the sheet discharge roller 74 discharges the document G to the document discharge tray 79.

Figure 3:
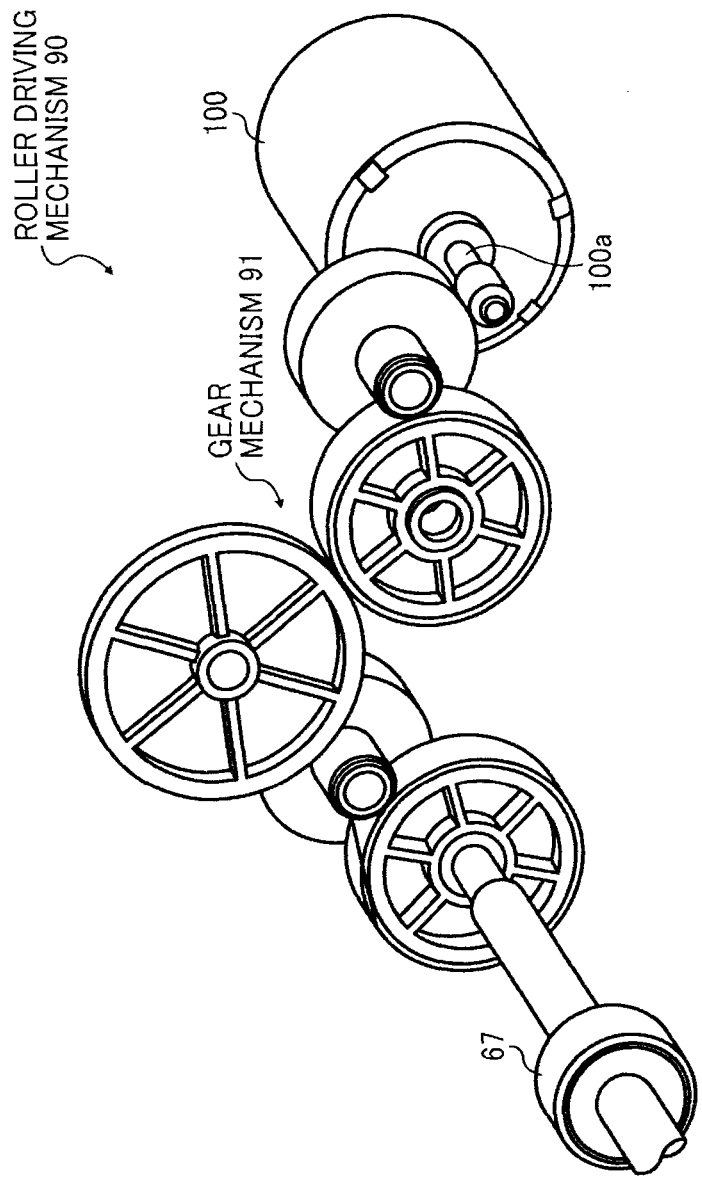
FIG. 3 is a perspective view illustrating a roller driving mechanism.
Figure 4:
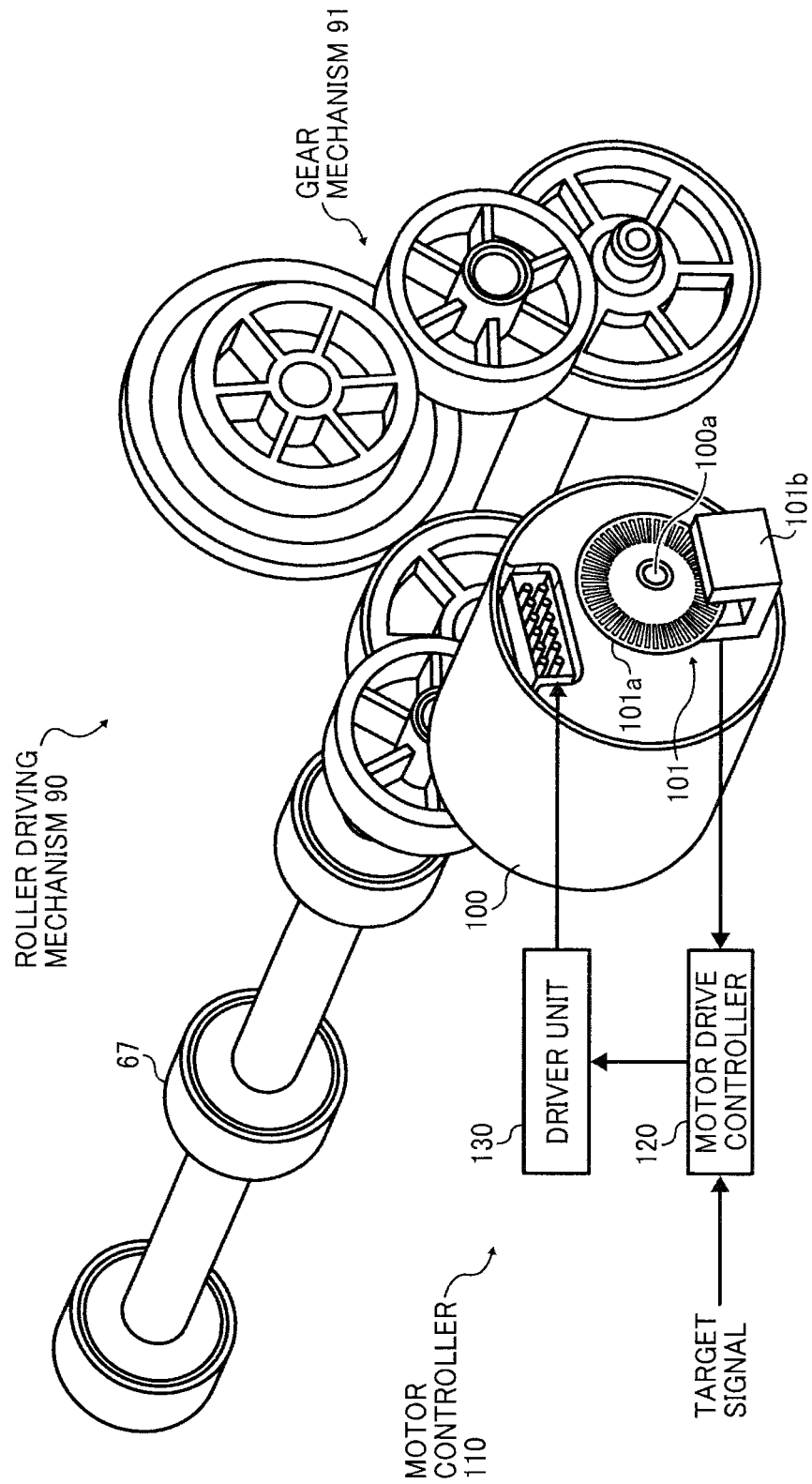
FIG. 4 is a perspective view illustrating a lateral side of a brushless DC motor in the roller driving mechanism.

With reference to FIGS. 3 and 4, the color printer 1 includes the brushless DC motor 100 as the driving motor to transport the sheet P and the document G; as illustrated in a roller driving mechanism 90 for the first scanning entrance roller 67 shown in FIGS. 3 and 4. In the color printer 1, the roller driving mechanism 90 is used not only for the reading roller 67 but also for various rollers, such as the first pushing roller 68, and the first scanner exit roller 70 and so on to transport the document G. In addition, the roller driving mechanism 90 is used for driving roller groups 13a to 13d and registration roller 25 to transport the sheet P. In the following description in the printer 1, the brushless DC motor 100 that drives the first scanning entrance roller 67 is described, but the above-described configuration and operation can be used for the brushless DC motor 100 that drives the other rollers and members.

In the roller driving mechanism 90, a gear mechanism 91 constituted by multiple gears positioned around the output shaft 100a of the brushless DC motor 100 detects the rotation of the brushless DC motor 100 and transports the rotation to the first scanning entrance roller 67.

Figure 5:
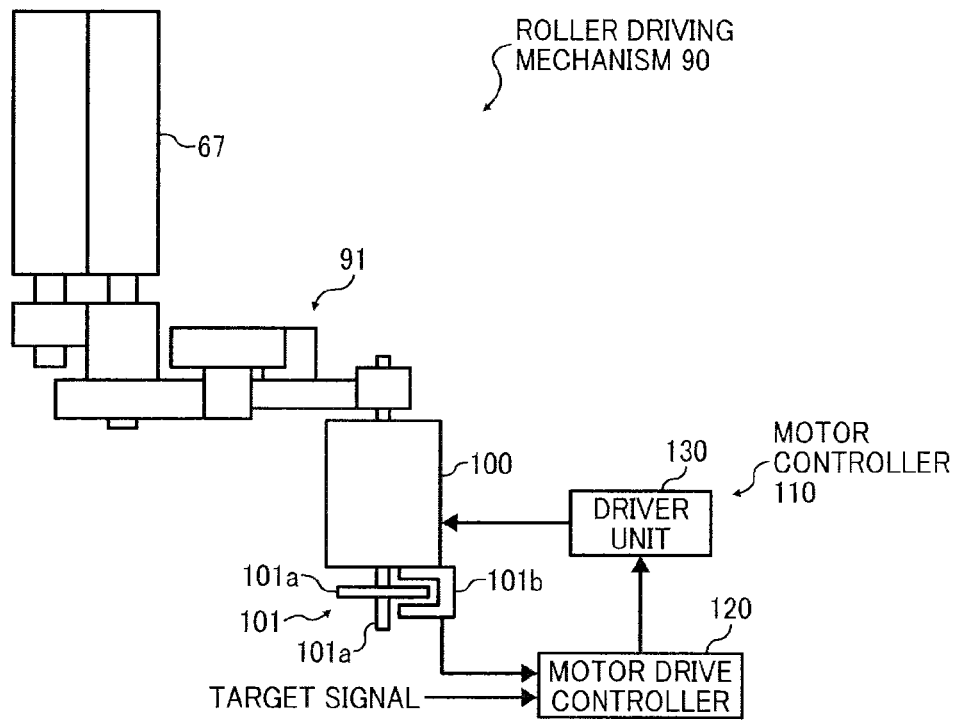
FIG. 5 is a schematic diagram illustrating the roller driving mechanism.

In the brushless DC motor 100, as illustrated in FIGS. 4 and 5, the encoder (rotation detector) 101 detects the rotation direction and the rotation speed (amount of rotation). The encoder 101 includes an encoder disc 101a attached to the output shaft 100a of the brushless DC motor 100 and a transparent photosensor 101b. A predetermined number of slits are formed in the encoder disc 101a at predetermined angle intervals in a circumferential direction. In a state in which an almost square U-shaped holder (not shown) holds the encoder disc 101a, the transparent photosensor 101b includes a light emitting element (light emission diode) and a light receiving element (photodiode) disposed facing to the held encoder disc 101a. In the encoder 101, the encoder disc 101a, attached to the output shaft 100a between the light emitting element and the light receiving element of the transparent photosensor 101b, is rotated with the rotation of the output shaft 100a, a detected light emitted from the light emitting element to the light receiving element passes through the slits of the encoder disc 101a, the light receiving element receives the detected light and outputs the encoder pulse (actual rotational signal) A and B for output to the motor drive controller 120 in a motor controller (motor control device) 110.

Figure 6:
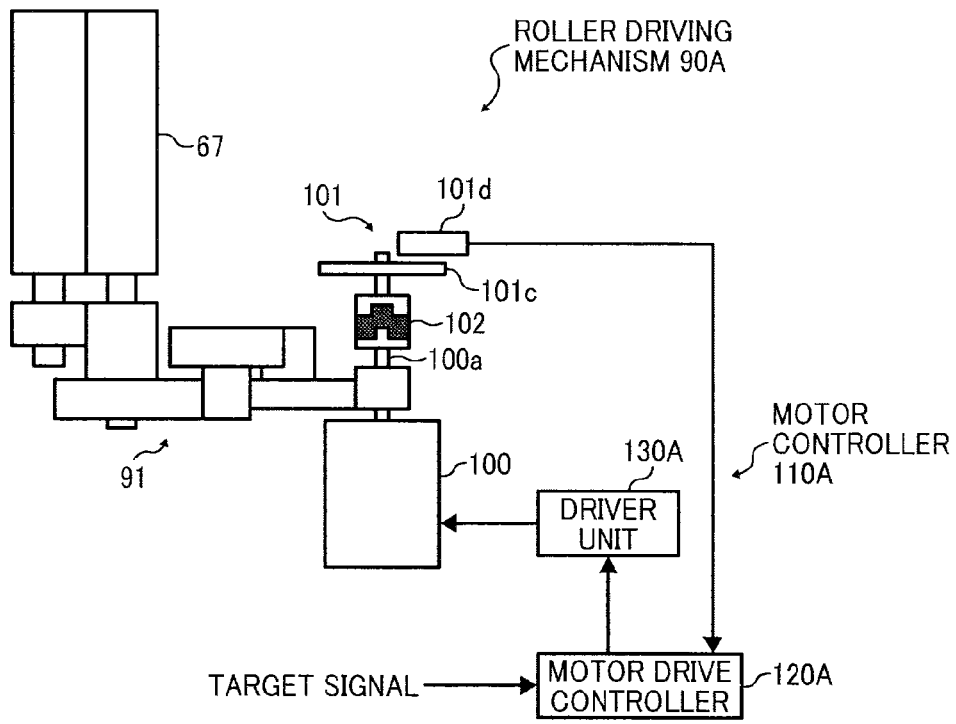
FIG. 6 is a schematic diagram illustrating the roller driving mechanism using a reflection type photosensor as an encoder.

It is to be noted that the encoder 101 is not limited to only that constituted by the transparent photosensor 101b. For example, the encoder 101 may be constituted by a reflection-type encoder disc 101c and a reflection-type photo sensor 101d. In FIG. 6, 102 represents a coupling to coaxially connect the output shaft 100a of the brushless DC motor 100 with the encoder disc 101c.

In this case, in the encoder disc 101c, a certain number of reflection plates having a predetermined width at a certain angle intervals in the circumferential direction, and the reflection-type photo sensor 101d, the and the light receiving element are mounted on the same face. The encoder 101, the light emitting element of the reflection-type photo sensor 101d emits the detection light toward the encoder disc 101c, and the reflection plate of the encoder disc 101c reflects the detection light and the reflected light is received at the light receiving element, and the light receiving element outputs the encoder pulse A and B to the motor drive controller 120 of the motor controller 110.

It is to be noted that, the photo sensors 101b and 101d used for the encoder 101 have two pairs of the light emitting element and the light receiving element, and 2 channel photo sensor is used so that the phase difference between the encoder pulses A and B output from the two light receiving elements is set to a certain amount (e.g., $\pi/2$[rad]). In addition, in the encoder discs 101a and 101, a slit or reflection plate that the 100 pulse per 1 cycle is output to the photosensors 101b and 101d.

(Configuration of Motor Controller)

Figure 7:
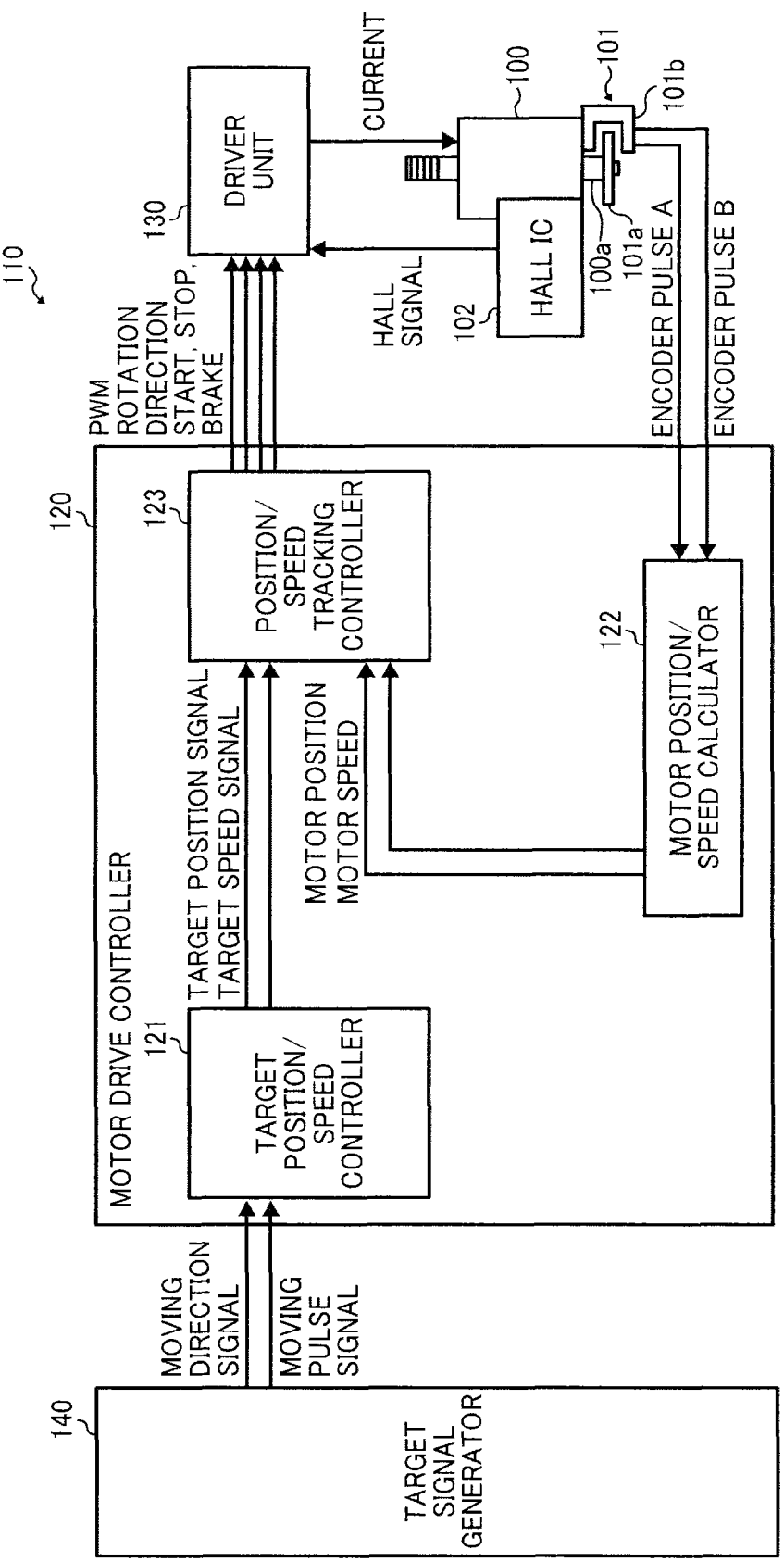
FIG. 7 is a block diagram illustrating a motor controller.

Next, the motor controller (motor control device) 110 is configured as illustrated in the block diagram shown in FIG. 7, includes a motor drive controller 120, a driver unit 130, the encoder 101, the target signal generator 140, a Hall IC 102, and the brushless DC motor 100 as the control target.

In the brushless DC motor 100, a permanent magnet is provided in the rotor, and a brush is not provided. Therefore, the Hall IC 102 is provided as a position detection element to detect the position of the rotor and the Hall IC 102 outputs the position detection result to the driver unit 130 as a Hall signal. Herein, the position detection of the rotor in the brushless DC motor 100 is not limited to use of the Hall IC 102. For example, alternatively, the driver 130 may detect an inductive voltage generated by a stator coil to estimate the rotary position of the rotor.

The motor drive controller (driver controller) 120 includes a target position/speed calculator 121, a motor position/speed calculator 122, and a position/speed tracking controller 123.

The target position/speed calculator 121 receives a rotary direction signal, a movement pulse number (target rotation number) from the target signal generator 140. The target signal generator 140 is provided, for example, in the copier 1 (not shown). The target signal generator 140 generates the movement direction signal indicating the rotary movement direction as a target of the brushless DC motor 100 and a movement pulse number signal indicating rotary position as a target, for outputting to the target position/speed calculator 121 in the motor drive controller 120. The movement direction signal and the movement pulse number signal may be formed as long as the information showing speed per time and position at the time, such as, rotary direction/target achievement degree and acceleration (acceleration time).

The target position/speed calculator 121 generates the target position and the target speed of the brushless DC motor 100 based on the target signal generator and the movement direction signal from the target signal generator 140 and time information of an oscillator (not shown), for outputting the target position signal and the target speed information to the position/speed tracking controller 123.

The motor position/speed calculator 122 receives the encoder pulses A and B as the actual rotation signal having phase differences $\pi/2$[rad] from the 2-channel photosensor 101b of the encoder 101, and the motor position/speed calculator 122 detects the rotational direction of the brushless DC motor, using the phase difference between the encoder pulse A and the encoder pulse B. The motor position/speed calculator 122 calculates the actual motor position and the motor speed (rotation amount of the brushless DC motor 100) based on the detected rotary direction and the time information of the oscillator.

The position/speed tracking controller 123 calculates position error between the target position indicated by the target position signal from the position/speed calculator 121 and the actual motor position (present position) indicated by the motor position signal from the motor position/speed calculator 122. Then, the position/speed tracking controller 123 generates a pulse width modulation (PWM) signal, the rotary direction signal, the start-stop signal and a brake signal as reverse control signals.

That is, the motor drive controller 120 generates and outputs the control signal to the driver unit 130 based on the target rotary signal and the encoder pulses A and B. In a predetermined hold state, polarity of the PWM signal is reversed for the predetermined reverse time at the certain time period T1.

The driver unit (driver) 130 controls the motor current and the PWM voltage of the brushless DC motor 100 based on the control signal containing the PWM signal from the position/speed tracking controller 123 and the Hall signal from the Hall IC 102. Along with these processes, in a locked state, the driver unit 130 blocks the power supply to the brushless DC motor 100. That is, the driver unit 130 supplies a drive power to rotate the brushless DC motor 100 based on the control signal output from the motor drive controller 120. When it is detected that the PWM signal from the motor drive controller 120 is not input for a time equal to or longer than a predetermine lock time Tr, the state proceeds to the locked state in which the supply of the driving power to the brushless DC motor 100 is cut off.

Then, the motor controller 110 read a motor control program executed by a motor control method, stored in a readable reading medium, such as ROM, EEPROM, flash memory, a flexible disc, a compact disc read only memory (CD-ROM), compact disc rewritable (CD-RW), a digital versatile disk (DVD), secure digital (SD) card, a magneto-optical disc (MO). Then the motor control program is imported in a non-volatile memory such as ROM in the motor controller 110. With this configuration, the hold state of the motor 100 is determined and the motor controller 110 executes the motor control method to maintain the hold state. The motor control program is a program such as computer performable program described in a legacy program such as assembler, C, C+, C#, Java(c) and object indication programming language. This program can be stored in the recording medium and can be disturbed.

The effect of the present embodiment is described below.

With this operation, the motor controller 110 can accurately distinguish between the hold state of the brushless DC motor 100, in which the brushless DC motor 100 is stopped while the motor position is kept under the control of the motor driver 110, and the locked state (idle state) of the brushless DC motor 100 in which the motor is stopped and in an idle condition without control of the motor controller 110.

In the digital color printer 1, the roller driving mechanism that drive the first scanning entrance roller 67 shown in FIGS. 3 to 6, transports the transfer sheet P and the document G, and the roller driving mechanism are used for many portions.

In the process of transporting a sheet P and a document D in the color printer 1, in order to set slack of the sheet and adjusting the timing of the sheet P while the sheet P or the document G is transported, it is necessary to keep a position hold state (hold state) in a state in which the position of the brushless DC motor 100 is kept and is stopped.

Figure 8:
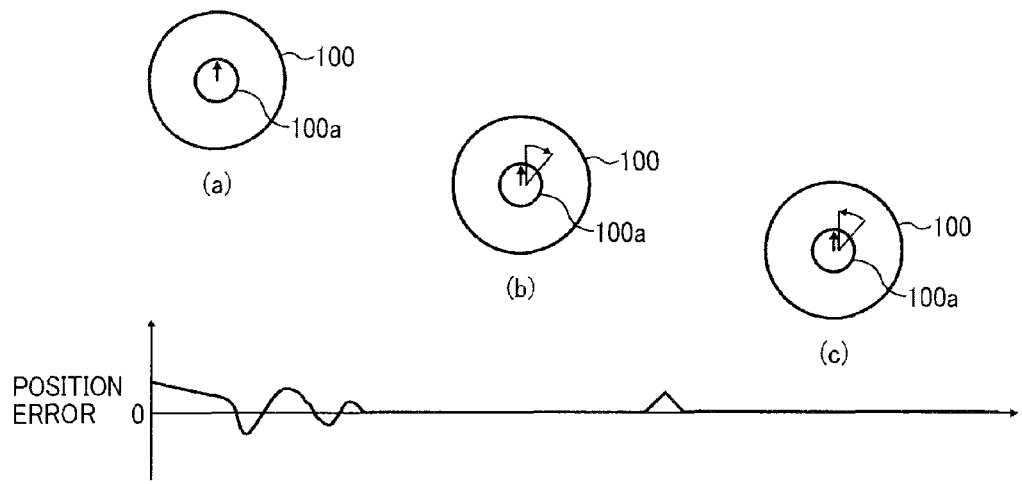
FIG. 8 is a diagram illustrating a position hold state of the motor.

In the position hold state, for example, as illustrated in FIG. 8, the motor drive controller 120 and the driver unit 130 supply the motor current and PWM voltage that is necessary for maintaining a stop position of the brushless DC motor 100 while the brushless DC motor 100 is stopped. FIG. 8A illustrates a state in which the state enters the position hold state in which the output shaft 100a is held at a direction indicated by arrow (not present in actual) shown in FIG. 8A. In the state shown in FIG. 8, the output shaft 100a of the brushless DC motor 100 is rotated in a circumferential direction shown in FIG. 8B due to the disturbance force, the encoder 101 detects the position fluctuation in the output shaft 100a, and reports the motor drive controller 120 using the encoder pulse A and the encoder pulse B. The motor position/speed calculator 122 of the motor drive controller 120 calculates the actual motor position and the actual motor speed of the output shaft 100a of the fluctuated motor 100, and outputs the motor position signal and the motor speed signal to the position/speed tracking controller 123. Then, the position/speed tracking controller 123 outputs the motor position signal and the motor speed signal, and the control signal such as PWM signal, the rotary direction signal, start-stop signal and brake signal needed for returning the position of the output shaft 100a to the hold position of the target position signal illustrated in FIG. 8A. Then, the driver 130 controls the motor current and the PWM voltage output to the brushless DC motor 100 based on the control signal from the position/speed tracking controller 123 and the Hall signal from the Hall IC 102, to return the position of the output shaft 100a of the brushless DC motor 100 to the certain hold position shown in FIG. 9A.

Figure 9:
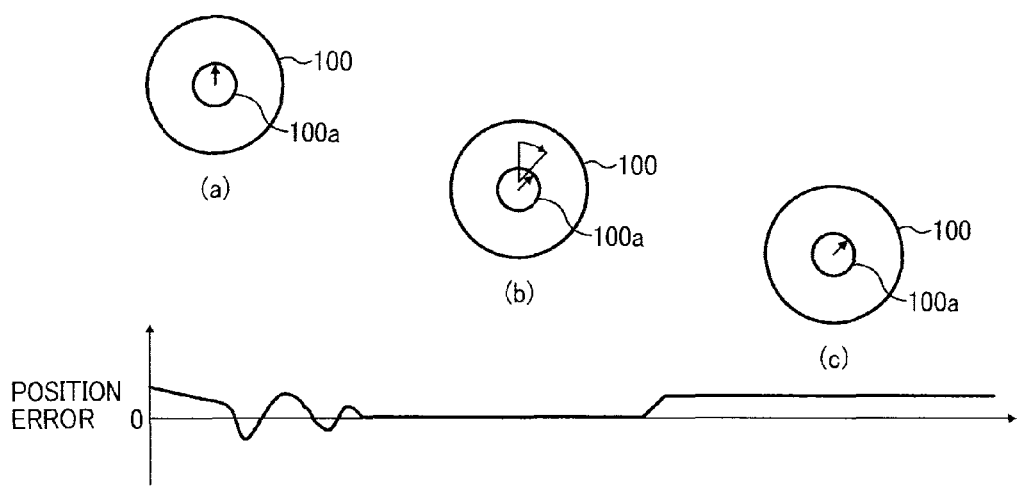
FIG. 9 is a diagram illustrating a locked state in which an output to the motor is cut off.

Conversely, when the control is not output for a predetermined lock detection time (locked-state detection time) Tr, the motor controller 110 recognizes that the brushless DC motor 100 is in an idle condition (locked state), and the drive unit 130 proceeds to the locked state in which the output of the motor current and the PWM voltage to the brushless DC motor 100 is blocked shown in FIG. 9.

In this locked state of the motor controller 110, since supply of the motor current and the PWM voltage to the brushless DC motor 100 is blocked, when the brushless DC motor 100 enters the idle condition at the stop position shown in FIG. 9A indicated by an arrow shown in 9A, as illustrated in FIG. 9B, even if the output shaft 100a fluctuates due to the distribution, the returning process to process back to the original position is not performed, and the motor is stopped at the fluctuated position shown in FIG. 9C.

In order to solve this problem, whether or not the driver unit 130 is in the position hold state or the locked state is accurately recognized, when the position is in the hold state, the necessary hold state is kept, and transporting the sheet P and the document G can be optimized.

Then, by setting a setting value of the control signal from the position/speed tracking controller 123 to the driver unit 130 to a below-described setting value, the driver unit 130 can accurately distinguish between the hold state and the locked state, and the hold state is kept.

The position/speed tracking controller 123 outputs the control signal, in particular, the PWM signal to control the PWM voltage output from the driver unit 130 to the brushless DC motor 100. Then the driver unit 130 output the PWM voltage to the brushless DC motor 100 based on the PWM signal, a polarity of the PWM voltage is reversed per polarity reverse cycle T1.

Then, in the position/speed tracking controller 123, a polarity reverse cycle (reverse cycle) T1 is set shorter than the lock detection time (locked-state detection time) Tr during which the driver unit 130 determines that the brushless DC motor 100 is in a locked state (T1<Tr).

Figure 10:
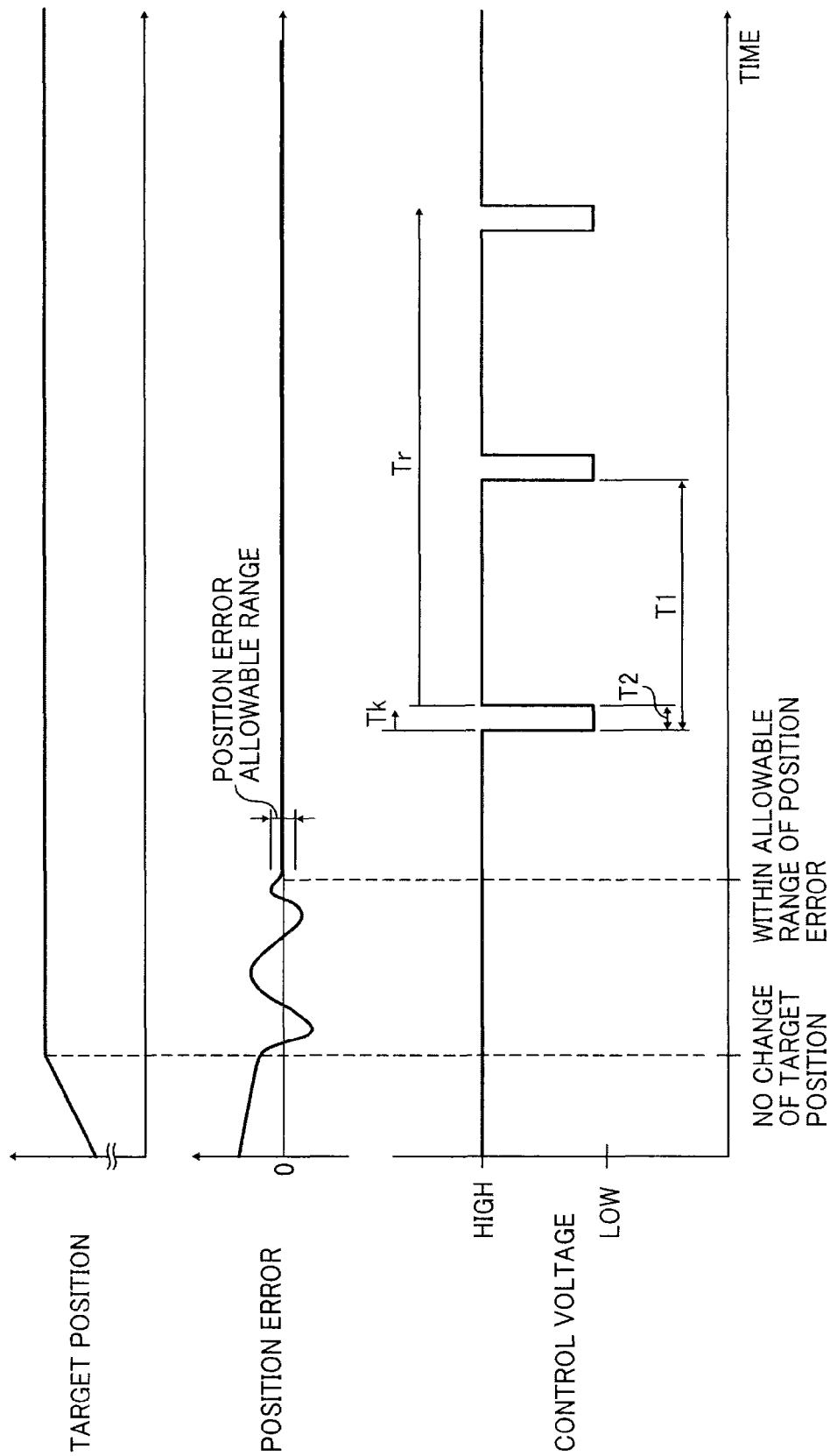
FIG. 10 is a diagram illustrating one example of a relation between a target position, a position error in a hold state, and a control voltage.
Figure 11:
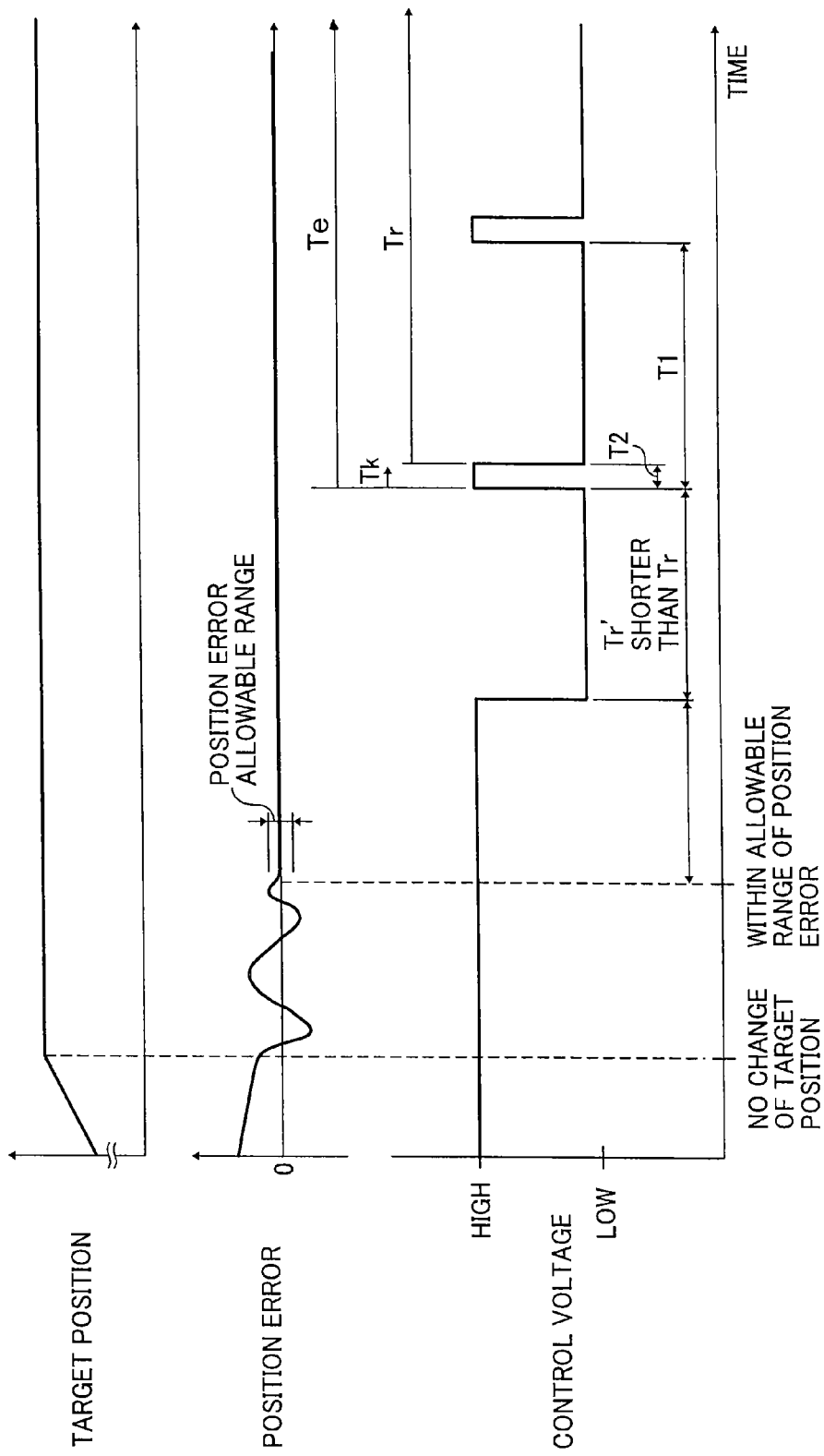
FIG. 11 is a diagram illustrating another example of a relation between a target position, a position error in a hold state, and a control voltage.

In addition, as illustrated in FIGS. 10 and 11, in the position/speed tracking controller 123, the time period (polarity reverse time period) T2 during which the polarity of the PWM signal is reversed, is equal to or longer than a polarity-reverse detectable time Tk during which the drive unit 130 can detect the reverse of the polarity of the PWM signal. At this time, the time period (polarity reverse time) T2 is shorter than the electric time constant value Te (T2<Te). That is, the following relation obtains: Tk (polarity-reverse detectable time period) ≤T2 (reverse time period)<Te (electrical time constant).

In this case, as illustrated in FIGS. 10 and 11, the rotation position (the position of the output shaft 100a) reaches the target position of the output shaft 100a, and the position error of the output shaft 100a is within the position error allowable range. It is to be noted that, an electrical time constant Te is expressed as "Te=L/Ra" (L: equivalent inductance, R: wire wound resistor), the electrical time constant Te indicates the time needed for increasing a current to 63% of a saturating value from when applying a constant voltage to a coil is started, in a state in which the output shaft 100a is restrained.

Accordingly, in the position hold state of the brushless DC motor 100, the PWM signal, input from the motor drive controller 120, is reversed to output a polarity reverse signal per the polarity reverse cycle T1 that is shorter than the lock detection time Tr, therefore, the driver unit 130 does not recognize the locked state as the position hold state.

Herein, the polarity reversed time T2 is set longer than the polarity-reverse detectable time Tk and is set shorter than the electrical time constant Te, which can surely prevent the driver unit 130 from erroneous recognition of the position hold state as the locked state, and prevent the brushless DC motor 100 from vibrating.

Conversely, the position/speed tracking controller 123 receives the target position signal indicating the target position, from the position speed calculator 121 and the motor position signal from the motor position speed calculator 122. Therefore, as illustrated in FIG. 8, when the position of the output shaft 100a of the brushless DC motor 100 deviates exceeding a position error allowable width from the target position, the position/speed tracking controller 123 outputs the control signal the driver unit 130 causes the brushless DC motor 100 to return to the original target position to maintain the position hold state.

Then, in a case in which the load is exerted on the brushless DC motor 100, the control voltage (driving voltage) is supplied to the brushless DC motor 100, and the hold state is maintained, when the polarity of the control signal is reversed, the control voltage is to be reversed and the reverse control voltage is to flow. Then, when the polarity of the control signal is returned and then the power supply voltage is returned, if the polarity reverse time T2 is long, the reverse of the control signal is repeatedly generated, and the brushless DC motor 100 may slightly vibrate. In order to solve this problem, the following relation obtains: Tk (polarity-reverse detectable time period)≤T2 (polarity reverse time period)<Te (electrical time constant). Therefore, this vibration can be prevented.

Herein, in the position/speed tracking controller 123 shown in FIG. 10, when the output shaft 100a of the brushless DC motor 100 is located at the target position and the position error is within the position error allowable range, the control signal is adjusted so that control signal is reversed to generate a reverse control signal (low-level control signal (e.g., reversed polarity voltage) shown in FIG. 10) for the polarity reverse time T2 per the reverse polarity cycle T1. In FIG. 11, the output shaft 100a of the brushless DC motor 100 is located to the target position; when the position error is within the position error allowable range, the polarity of the control voltage is reversed once for a time Tr' shorter than the lock detection time Tr. Then, the polarity of the control voltage is repeatedly reversed to generate a reverse control signal (high-level control signal (e.g., straight polarity voltage) shown in FIG. 11) for the polarity reverse time T2 per the polarity reverse cycle T1.

In any cases of FIGS. 10 and 11, the driver unit 130 can accurately distinguish between the hold state of the brushless DC motor 100 and the locked state (in an idle condition) of the brushless DC motor 100 and can prevent the brushless DC motor 100 from vibrating.

In the above-described setting, the following relation obtains: Tk (polarity-reverse detectable time period)≤T2 (reverse time period)<Te (electrical time constant) (Tk≤T2<Te). Alternatively, as another setting, the following relation may obtain: "Tk (polarity-reverse detectable time period)≤T1 (polarity reverse cycle)–T2 (reverse time period)<Te (electrical time constant) (Tk≤T1–T2<Te)." In this case, by setting the polarity reverse time T2 to be longer, the time obtained by subtracting the reverse time period T2 from the polarity reverse time T1 is shorter and is within a period between the polarity-reverse detectable time Tk and the electrical time Te. In this setting, similarly to the above-described operation, generation of the vibration can be prevented. Herein, the time amount of polarity reverse cycle T1 and the polarity reverse time T2 may vary.

As described above, the motor controller 110 is operatively connected to a motor 100 having an output shaft 100a. The motor controller 110 includes a rotary detector (encoder) 101, a drive controller 120, and a driver 130. The rotary detector 101 detects a rotation direction and a rotation amount of the output shaft of the motor to generate an actual rotary signal. The drive controller 120 receives a target rotary signal indicating a target rotary direction and a target rotary amount, generates a control signal based on the actual rotary signal and the target rotary signal. The driver 130 supplies a driving power to the motor based on the control signal from the drive controller 120. When the motor 100 is in a hold state, the drive controller 130 periodically generates a reverse control signal whose polarity is reversed for a predetermined reverse time period T2 per a predetermined one reverse cycle T1. When the reverse control signal is not output from the driver controller 120 for a certain lock detection time period Tr that is longer than the revere cycle T1 of the control signal, the driver 130 blocks supply of the driving power to the motor, to put the motor in a locked state.

With this configuration, in the position hold state, the motor drive controller 120 outputs the PWM signal, which is periodically reversed at a reverse cycle T1 that is shorter than the lock detection time (locked-state detection time) Tr of the driver 130, to the driver unit 130, and the driver unit 130 can detect the (reverse state of) the PWM signal within the lock detection time Tr, and accurately recognizes that the position hold state is separated from locked state, and the position hold state is kept.

In the printer 1, a motor control method to control the motor 100 having the output shaft 100a includes the steps of: detecting a rotation direction and a rotation amount of the output shaft of the motor to generate an actual rotary signal; receiving a target rotary signal indicating a target rotary direction and a target rotary amount; generating a control signal based on the actual rotary signal and the target rotary signal; when the motor is in a hold state, reversing the control signal periodically for a predetermined time period T2 per a predetermined one reverse cycle T1; supplying a driving power to the motor based on the control signal; and when the control signal is not reversed for a certain lock detection time period Tr that is longer than the revere cycle T1 of the control signal, blocking supply of the driving power to the motor to put the motor in a locked state.

With this configuration, in the position hold state, the motor drive controller 120 outputs the PWM signal, which is periodically reversed at a reverse cycle T1 that is shorter than the lock detection time of the driver 130, to the driver unit 130, and the driver unit 130 can detect the (reverse state of) the PWM signal within the lock detection time Tr, and accurately recognizes that the position hold state is separated from locked state, and the position hold state is kept.

In addition, the present invention of the present disclosure can provide, in addition to the motor controller 110 and the motor control method described above, a computer readable program for executing the method. The computer program to be executed by the target recognition system according to the present embodiment can be provided by being recorded in a computer-readable recording medium such as a CD-ROM, an FD, a CD-R, and a DVD as a file in an installable format or an executable format. A motor control program includes computer program codes that, when executed on the motor controller 110, instructs the motor controller 110 to perform the motor control method as described above. Further, a non-transitory computer readable storage medium may store the above-described computer program codes.

Further, with an electrical time constant of the motor represented by Te, the reversed time of the reverse control signal represented by T2, a polarity-reverse detectable time represented by Tk, the following relation obtains: Tk≤T2<Te.

With this configuration, in a case in which the load is exerted on the brushless DC motor 100, the driving voltage (power supply voltage) is supplied to the brushless DC motor 100, and the hold state is maintained, when the polarity of the control signal is reversed, the driving voltage is to be reversed and the reverse driving voltage is to flow. Then, when the polarity of the control signal is returned and then the driving voltage is returned, if the polarity reverse time T2 is long, the above-described operation of supplying the reverse driving voltage continuously (repeatedly) occur, and accordingly, the brushless DC motor 100 may vibrate. However, in this configuration, by setting the relative time to "Tk≤T2<Te, generation of this vibration can be prevented.

Alternatively, with an electrical time constant of the motor represented by Te, the reversed time of the reverse control signal represented by T2, a polarity-reverse detectable time represented by Tk, the following relation obtains: Tk≤T1–T2<Te.

With this configuration, in a case in which the load is exerted on the brushless DC motor 100, the power supply voltage (driving voltage) is supplied to the brushless DC motor 100, and the hold state is maintained, when the polarity of the control signal is reversed, the driving voltage is to be reversed and the reverse driving voltage is to flow. Then, when the polarity of the control signal is returned and then the driving voltage is returned, if the polarity reverse time T2 is long, the above-described operation of supplying the reverse driving voltage continuously (repeatedly) occur, and accordingly, the brushless DC motor 100 may vibrate. However, in this configuration, by setting the relative time to "Tk<T1–T2<Te, generation of this vibration can be prevented.

The drive controller 120 calculates a position error between the target position indicated by the target rotary signal and a present position indicate by the actual rotary signal, determines the motor control device as the hold state, when the target rotary signal is kept at a certain value for a predetermined waiting time, the position error is within a predetermined acceptable value, and the drive controller 120 outputs the reverse control signal repeatedly when the hold state is kept.

With this configuration, while the position hold state is kept, the PWM signal is repeatedly output, and the error recognition that the position hold state is erroneously recognized as the locked state can be surely prevented, which improves convenience.

The motor is a brushless direct-current (DC) motor having a rotary shaft, and the rotary detector is an encoder to detect the rotational direction and the rotation amount of the rotary shaft of the brushless DC motor.

With this configuration, the error recognition that the driver unit 130 to drive the brushless DC motor 100 erroneously recognizes the position hold state as the locked state can be surely and inexpensively prevented, which can improve convenience inexpensively.

Numerous additional modifications and variations are possible in light of the above teachings. It is therefore to be understood that, within the scope of the appended claims, the disclosure of this patent specification may be practiced otherwise than as specifically described herein.

What is claimed is:

1. A motor controller, operatively connected to a motor having an output shaft, comprising:
    a rotary detector to detect a rotation direction and a rotation amount of the output shaft of the motor to generate an actual rotary signal;
    a drive controller to receive a target rotary signal indicating a target rotary direction and a target rotary amount, and generate a control signal based on the actual rotary signal and the target rotary signal; and
    a driver to supply driving power to the motor based on the control signal from the drive controller,
    wherein, when the motor is in a hold state, the drive controller periodically generates a reverse control signal whose polarity is reversed for a predetermined reverse time period T2 per a predetermined one reverse cycle T1,
    wherein, when the reverse control signal is not output from the drive controller for a certain lock detection time period Tr that is longer than the reverse cycle T1 of the control signal, the driver blocks supply of the driving power to the motor, to put the motor in a locked state.

2. The motor controller according to claim 1, wherein, with an electrical time constant of the motor represented by Te, the reverse time period of the reverse control signal represented by T2, and a polarity-reverse detectable time period represented by Tk, the following relation obtains: Tk≤T2<Te.

3. The motor controller according to claim 1, wherein, with an electrical time constant of the motor represented by Te, the reverse cycle of the control represented by T1, the reverse time period of the reverse control signal represented by T2, and a polarity-reverse detectable time period represented by Tk, the following relation obtains: Tk≤T1−T2<Te.

4. The motor controller according to claim 1, wherein the drive controller calculates a position error between a target position indicated by the target rotary signal and a present position indicated by the actual rotary signal,
    wherein, when the target rotary signal is kept at a certain value for a predetermined waiting time and the position error is within a predetermined acceptable value, the drive controller determines that the motor is in the hold state and repeatedly outputs the reverse control signal while the hold state is kept.

5. The motor controller according to claim 1, wherein the motor comprises a brushless direct-current (DC) motor having an output shaft,
    the rotary detector comprises an encoder to detect a rotational direction and a rotation amount of the output shaft of the brushless DC motor.

6. An image processing apparatus, comprising:
    a transport mechanism, including a motor having an output shaft, to transport a sheet of paper, using drive and rotation of the motor;
    an image forming unit to form an image using sheet of paper,
    a motor control device, operatively connected to the motor in the transport mechanism to control the motor;
    the motor control device comprising:
        a rotary detector to detect a rotation direction and a rotation amount of the output shaft of the motor to generate an actual rotary signal;
        a drive controller to receive a target rotary signal indicating a target rotary direction and a target rotary amount, and generate a control signal based on the actual rotary signal and the target rotary signal,
        a driver to supply a driving power to the motor based on the control signal from the drive controller;
    wherein, when the motor is in a hold state, the drive controller periodically generates a reverse control signal whose polarity is reversed for a predetermined reverse time period T2 per a predetermined one reverse cycle T1,
    wherein, when the reverse control signal is not output from the drive controller for a certain lock detection time period Tr that is longer than the reverse cycle T1 of the control signal, the driver blocks supply of the driving power to the motor to put the motor in a locked state.

7. A motor control method to control a motor having an output shaft, comprising the steps of:
    detecting a rotation direction and a rotation amount of the output shaft of the motor to generate an actual rotary signal;
    receiving a target rotary signal indicating a target rotary direction and a target rotary amount;
    generating a control signal based on the actual rotary signal and the target rotary signal;
    when the motor is in a hold state, reversing the control signal periodically for a predetermined reverse time period T2 per a predetermined one reverse cycle T1;
    supplying a driving power to the motor based on the control signal; and
    when the control signal is not reversed for a certain lock detection time period Tr that is longer than the reverse cycle T1 of the control signal, blocking supply of the driving power to the motor to put the motor in a locked state.

* * * * *